United States Patent [19]

Brown

[11] Patent Number: 5,079,708
[45] Date of Patent: Jan. 7, 1992

[54] ROAD VEHICLE CORNERING ASSISTANCE MECHANISM

[76] Inventor: Jack L. Brown, 89 Highland View, Irvine, Calif. 92715

[21] Appl. No.: 615,433

[22] Filed: Nov. 16, 1990

Related U.S. Application Data

[63] Continuation-in-part of Ser. No. 328,327, Mar. 24, 1989, abandoned.

[51] Int. Cl.$^5$ .............................................. B60T 8/00
[52] U.S. Cl. ........................... 364/424.05; 364/426.02
[58] Field of Search ................... 364/426.02, 426.03, 364/424.05; 303/96, 106, 110, 111, 115; 180/197

[56] References Cited

U.S. PATENT DOCUMENTS

| | | | |
|---|---|---|---|
| 2,912,884 | 11/1959 | Christenson et al. | 74/759 |
| 3,288,232 | 11/1966 | Shepherd | 180/1 |
| 4,154,487 | 5/1979 | Vannini | 303/106 |
| 4,156,547 | 5/1979 | Marsh | 303/96 |
| 4,344,139 | 8/1982 | Miller et al. | 364/426 |
| 4,509,802 | 4/1985 | Solleder et al. | 303/110 |
| 4,521,856 | 6/1985 | Phelps et al. | 364/426 |
| 4,554,990 | 11/1985 | Kamiya et al. | 180/197 |
| 4,626,040 | 12/1986 | Ogino | 303/96 |
| 4,718,736 | 1/1988 | Fennel et al. | 303/111 |
| 4,738,332 | 4/1988 | Wright | 180/197 |
| 4,741,581 | 5/1988 | Krohn | 303/115 |
| 4,753,312 | 6/1988 | Burgdorf et al. | 180/197 |
| 4,754,824 | 7/1988 | Olsson | 180/6.48 |
| 4,762,196 | 8/1988 | Harada et al. | 180/197 |
| 4,763,262 | 8/1988 | Leiber | 364/426 |
| 4,848,280 | 11/1989 | Brugger et al. | 364/426 |
| 4,884,651 | 12/1989 | Harada et al. | 369/426.03 |
| 4,967,865 | 11/1990 | Schindler | 364/426.03 |
| 4,967,869 | 11/1990 | Nagaoka et al. | 180/197 |

OTHER PUBLICATIONS

Porsches in Provence, Road & Track Magazine, pp. 44-49.
Donald L. Margolis and Lance Cleveland, "All Wheel Independent Torque Control", The Engineering Society for Advanced Mobility Land Sea and Airspace, San Francisco, Conference Aug. 1988.

Primary Examiner—Salvatore Cangialosi
Attorney, Agent, or Firm—Henri J. A. Charmasson

[57] ABSTRACT

A mechanism for improving the cornering capability of a road vehicle apportions torques applied to wheels differentially between the right and left wheels as a function of the vehicle speed, steering angle and lateral acceleration. Instantaneous differential torques are computed using these and other variable parameters which are continuously monitored, as well as some constant parameters including the characteristics of the vehicle and its tires. The differential torques may be applied by modulating brake force separately for each wheel or through differential clutch arrangements. Applications to rear-driven wheels only, all four wheels, and even single-side wheels are disclosed. The latter is designed to achieve the stagger effect on circular race tracks.

15 Claims, 8 Drawing Sheets

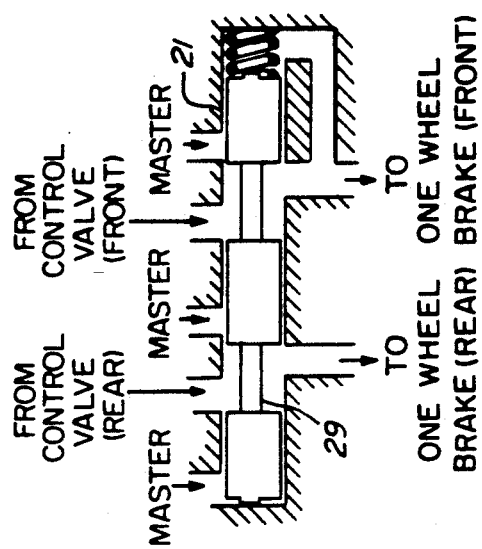
FIG. 5
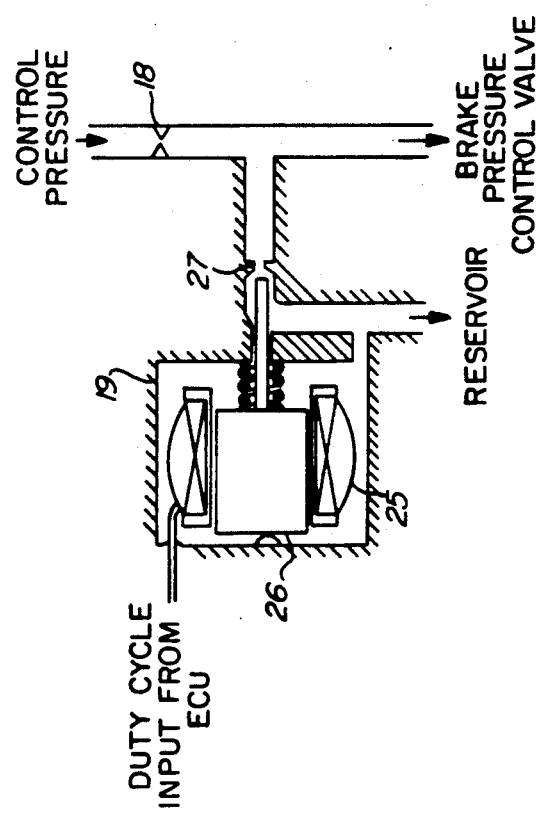
FIG. 6
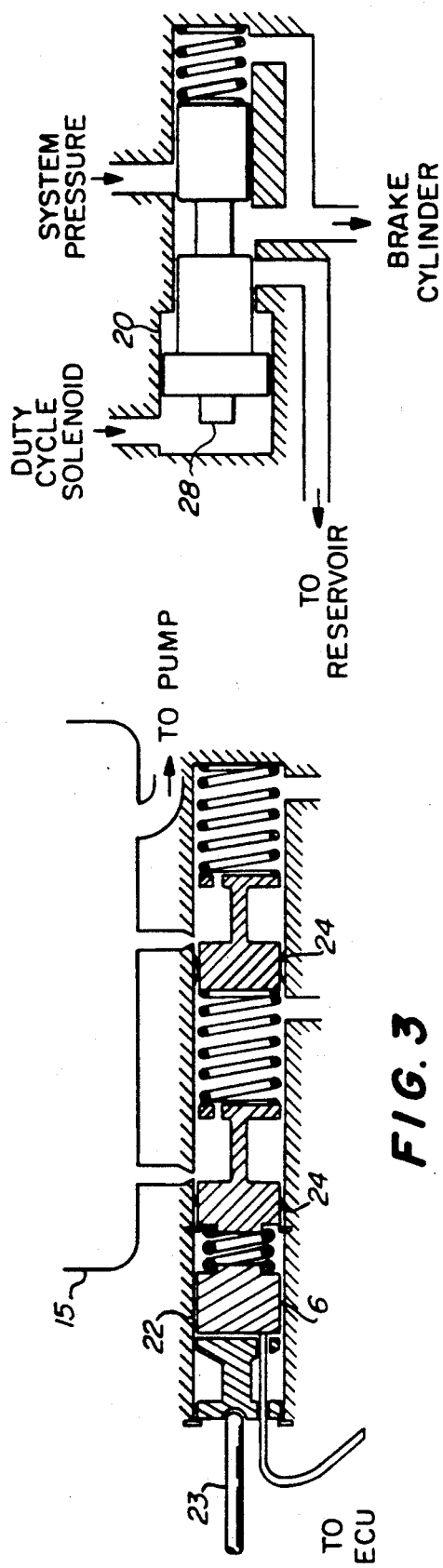
FIG. 3
FIG. 4

ROAD VEHICLE CORNERING ASSISTANCE MECHANISM

PRIOR APPLICATION

This is a continuation-in-part of application Ser. No. 07/328,327 filed Mar. 24, 1989 and was abandoned.

FIELD OF THE INVENTION

This invention relates to wheeled vehicle power transmission systems, and more specifically to differential drive mechanisms.

BACKGROUND OF THE INVENTION

The automobile industry has forever strived to design vehicles with improved traction, handling and cornering capabilities. It is clear that four-wheel drive offers improved vehicle handling on rough surfaces and under poor traction conditions. Now four-wheel steering which has been recently introduced on the automobile market is touted as a significant advance in cornering capabilities. Perhaps the most significant progress has been achieved in the design of tires which are capable of maintaining a substantial tractive force under sharp cornering slip angle conditions and high speed. Today's most automobile tires can retain an available tractive force of up to 300 Kg during cornering maneuvers at slip angles of 5 to 10 degrees and under cornering forces in excess of 200 Kg. One may say that this available tractive force is greatly under-utilized particularly on the rear wheels of a conventional front-steered road vehicle .

Besides the conventional differential which shifts the torque applied to a driving pair of wheels from the inner wheel to the outer wheel, the only torque controlling mechanism currently in use are limited to the anti-brake locking systems and wheel spin control apparatus. An example of the former is disclosed in U.S. Pat. No. 4,718,736 Fennel et al., and the latter is typified by the disclosure of U.S. Pat. No. 4,762,196 Harada et al. However, those two mechanisms are not directly intended to assist the vehicle in cornering or any other attempt to steer the vehicle. While these advance systems monitor the steering wheel angle, speed and lateral or longitudinal accelerations, it is only for the purpose of modifying the threshold above which the system becomes effective. In fact, these mechanisms are specifically designed to avoid any change of direction of the vehicle that might result from excessive braking or wheel spinning actions.

SUMMARY OF THE INVENTION

This invention is predicated on the fact that modern tire characteristics allow a surface vehicle wheel to be subjected to relatively large excursions in positive and negative torques at any speed and under relatively wide slip angle conditions occurring during turning maneuvers, without uncontrollable losses of friction. The invention teaches how to apply the driving torques differentially to right and left wheels in order to improve the cornering capabilities of the vehicle. In other words, the preferred embodiment of the invention can use the available traction in the rear tires of an automobile to increase the lateral acceleration without loss of vehicle stability. The increase of cornering force is obtained at a relatively small expense of the available torque control Within certain limits reflecting the vehicle and its tire characteristics, the applicable differential torques may be calculated as a function of the vehicle linear speed, V, the steer angle, a, and the lateral acceleration g.

For example, in a two-axle vehicle of given weight, m, longitudinal distance, b between the center of gravity and the rear axle, front distributed weight, w, wheelbase, 1, and track, t, the difference between the wheel torques, $F_1 - F_2$ applicable to the right and left wheels can be expressed as follows:

$$F_1 - F_2 = \frac{(CbmdV^2 - bmg)}{t/2}$$

wherein,

C is a constant,
V is the linear speed
d is the steer angle and
g is the lateral acceleration The preferred embodiment of the invention uses the vehicle speed, steer angle, lateral acceleration, distributable torque, and operator-applied braking force, which are derived from a variety of sensors and transducers, as well as various constant parameters to compute the differential torques to be applied to the right and left wheel, in order to optimize the cornering movement of the vehicle. The constant parameters include the weight and other characteristics of the vehicles, as well as tire characteristics and other data pertinent to the available traction and safety limits.

BRIEF DESCRIPTION OF THE DRAWING

FIG. 3 is a cross-sectional schematic view of the master brake cylinder;

FIG. 4 is a cross-sectional schematic view of the duty cycle solenoid valve;

FIG. 5 is a cross-sectional schematic view of the brake pressure control valve;

FIG. 6 is a cross-sectional schematic view of the override valve;

DESCRIPTION OF THE PREFERRED EMBODIMENT OF THE INVENTION

Figure 1:
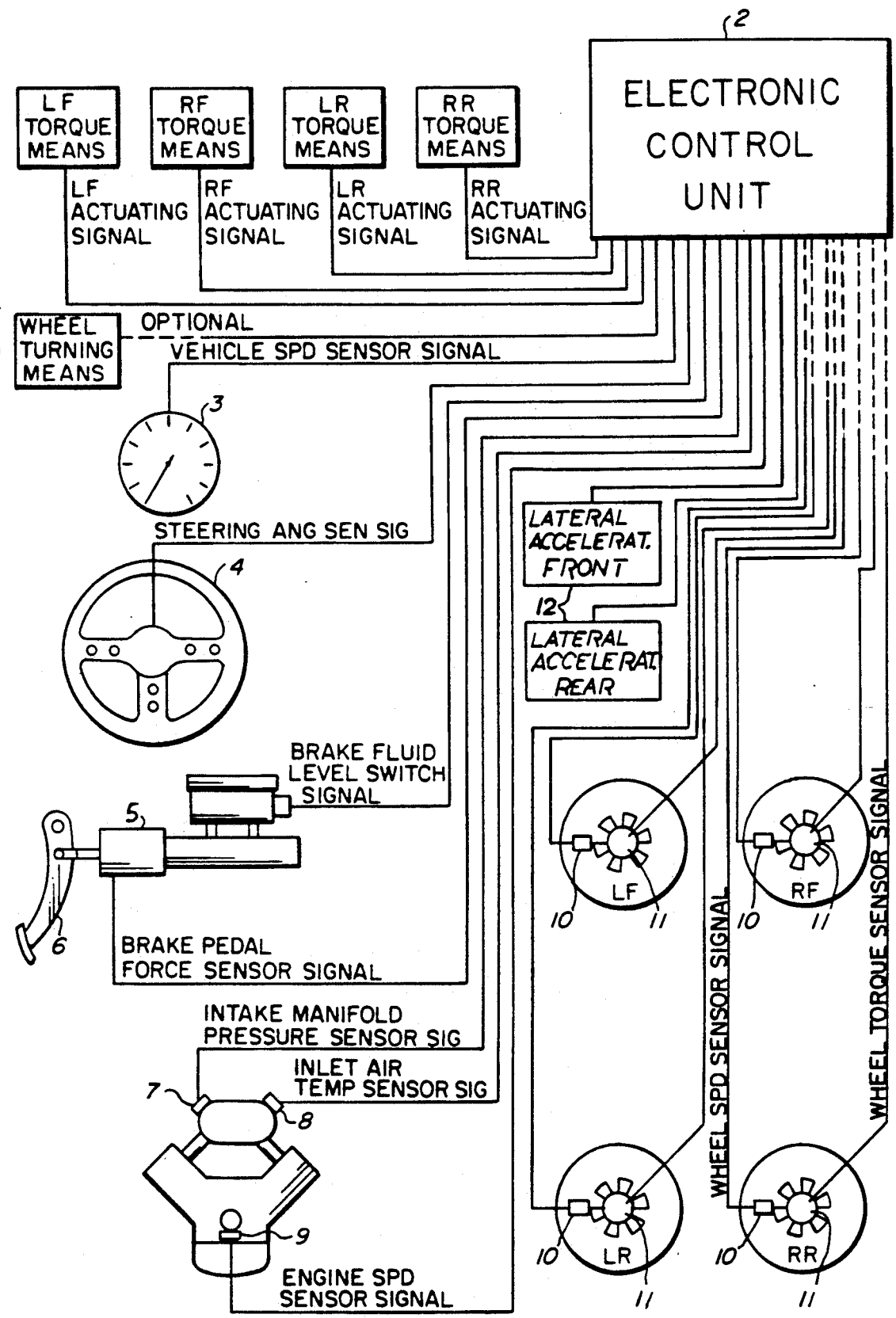
FIG. 1 is a block diagram of the vehicle cornering assistance mechanism.

Referring now to the drawing, the preferred embodiment of the road vehicle cornering assistance system according to the invention will be described.

It should be understood that this embodiment of the invention may be adapted to a variety of road vehicles besides the conventional four-wheel front steered automobile or truck. The invention is applicable to any vehicle having at least one set of right and left wheels including, but not limited to, motorized tricycles, trailers and semi-trailers.

As illustrated in FIG. 1, the heart of the cornering assistance system is an electronic control unit ECU 2, which may be implemented with a conventional microprocessor including a random access memory, RAM, and a read only memory, ROM. The ECU 2 receives inputs from a variety of sensors and transducers indicative of the dynamic condition of the vehicle and its power train. The vehicle speed can be derived from a speedometer 3. The desired turn angle may be derived from a transducer associated with the steering wheel 4 of the vehicle, with the articulated front axle bearing of a trailer, or with the fifth wheel connection of a semi-trailer. Any braking force applied by the operator of the vehicle is sensed by a transducer 5 coupled with the brake pedal 6. An intake manifold pressure sensor 7, an inlet air temperature sensor 8, and an engine speed magnetic pickup sensor 9 may also be used to provide indication of the available engine torque. Each wheel of the vehicle can also be equipped with separate speed indicators 10 and torque transducers 11. Front wheel and back wheel lateral accelerations are obtained from two accelerometers 12. The ECU 2 combines some or all the parameters given by the various sensors and transducers with constant parameters stored in its memory which reflects the characteristics of the vehicle and of its tires, to generate torque control signals which are sent to separate torque control mechanisms associated with at least one right wheel and one left wheel.

Figure 10:
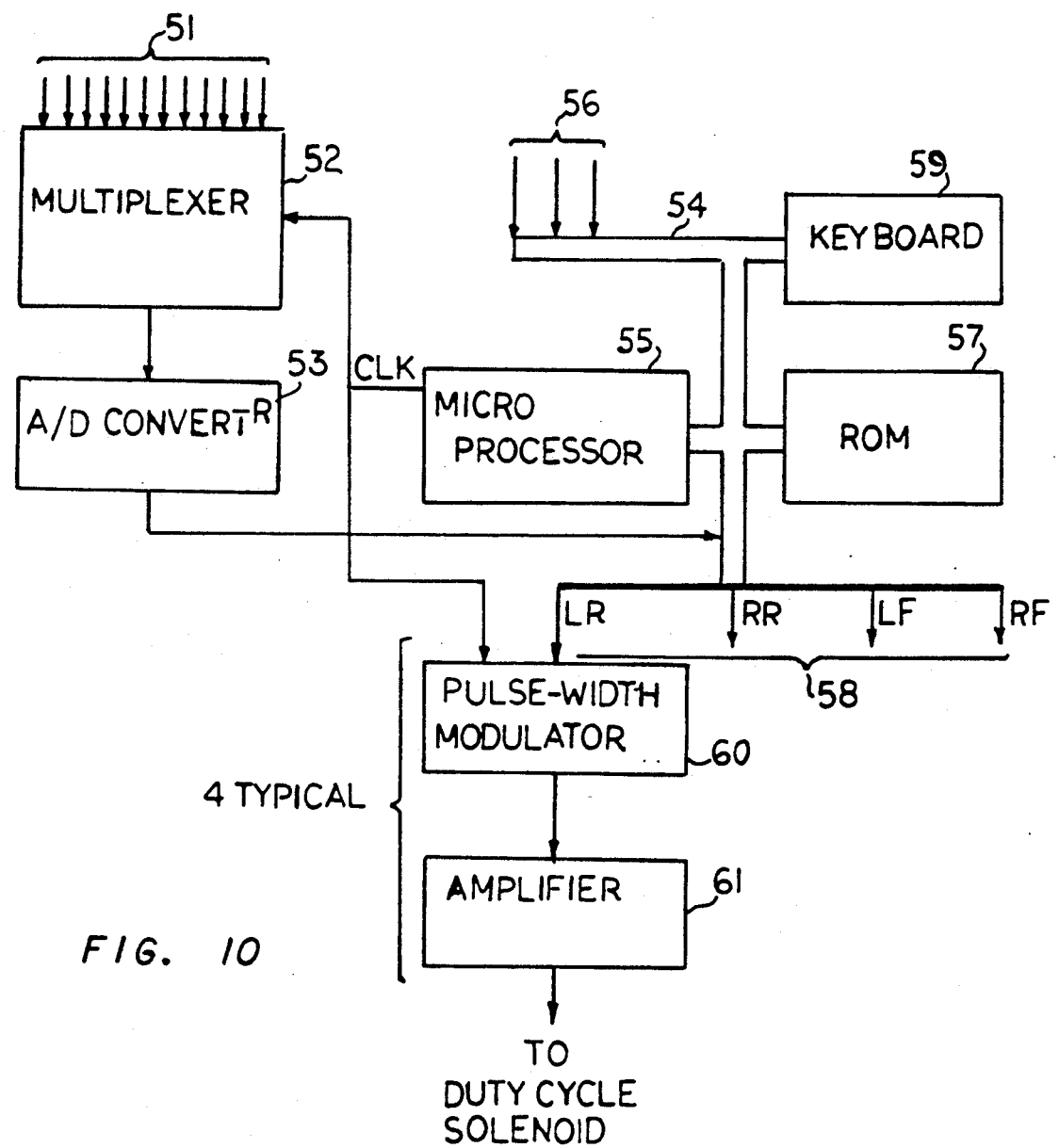
FIG. 10 is block diagram of the electronic control unit.

The ECU 2 is organized and programmed to integrate and coordinate the cornering assistance mechanism with separate spin control and antibrake lock systems. Alternately, the wheel spin and antilock brake control function may be performed by the cornering assistance mechanism. The operation of the electronic control unit is best understood with reference to the block diagram of FIG. 10 and the flow diagram of FIG. 11.

The output signals 51 from the majority of the sensors and transducers are fed to a multiplexer 52 which presents them sequentially to the input of an analog-to-digital converter 53. The digitized output of the analog-to-digital converter is fed to the data bus 54 of a microprocessor 55. The digital output signals 56 from a few sensors and transducers are fed directly to the bus 54 of the microprocessor. A ROM 57 holds a look-up table which can yield sets of differential torque values to be applied to the wheels of the vehicle. In the preferred embodiment of the invention, separate torque values 58 are extracted for the right and left, and front and rear wheels. The torque values stored in the ROM are set in accordance with some constant parameters such as vehicle and tire characteristics, safety limits, and other given criteria. The ROM 57 is addressed by a coded word generated by the logic and control section 55 of the microprocessor. The coded word is based on the variable parameters received from the various sensors and transducers including the available torque power calculated from the transducers and sensors monitoring the performance of the vehicle engine. As previously explained, the differential torque values 58 can be calculated as a function of the lateral acceleration, the speed of the vehicle and the steering angle of the front and rear pairs of wheels.

It can now be understood that according to well-known programming techniques, the microprocessor can be made to generate separate torque control signals 58 for the various wheels of the vehicle taking into account both given parameters corresponding to the characteristics of the vehicle and variable parameters which are instantaneously gathered by the various sensors and transducers. Input signals of variable parameters to the ECU may also include: air temperature (indicating the likelihood of icy conditions), humidity (indicating the likelihood of wet conditions), wind speed and direction (for calculating wind loads) and operator-entered constant parameters, such as road surface (e.g., gravel, concrete, or asphalt), load level and position, trailer loads, or other special conditions affecting the handling of the vehicle. Some of the constant parameters may be entered into the system by means of a keyboard 59, or other operator-controlled device. Each one of the digital torque control signals 58 generated by the microprocessor 55 is fed to a pulse width modulating circuit 60 which converts it into a pulse train having a duty cycle proportional to the desired torque value. The pulse train is amplified by a duty cycle amplifier 61 then applied to a solenoid valve 62 which modulates a torque control mechanism associated with the corresponding wheel as will be further explained below.

In addition to calculating some of the critical parameters necessary to generate the address codes for the ROM 57, the logic and control circuit 55 of the microprocessor can also be given the task of monitoring the behavior of each wheel in order to detect or anticipate brake lock-up and wheel spin conditions. Upon detecting such conditions, triggering signals may be sent to separate anti-lock, anti-spin and other independent traction control mechanisms. Alternately, corrective action may be calculated by the microprocessor and integrated within the digital torque control signals 58.

Figure 11:
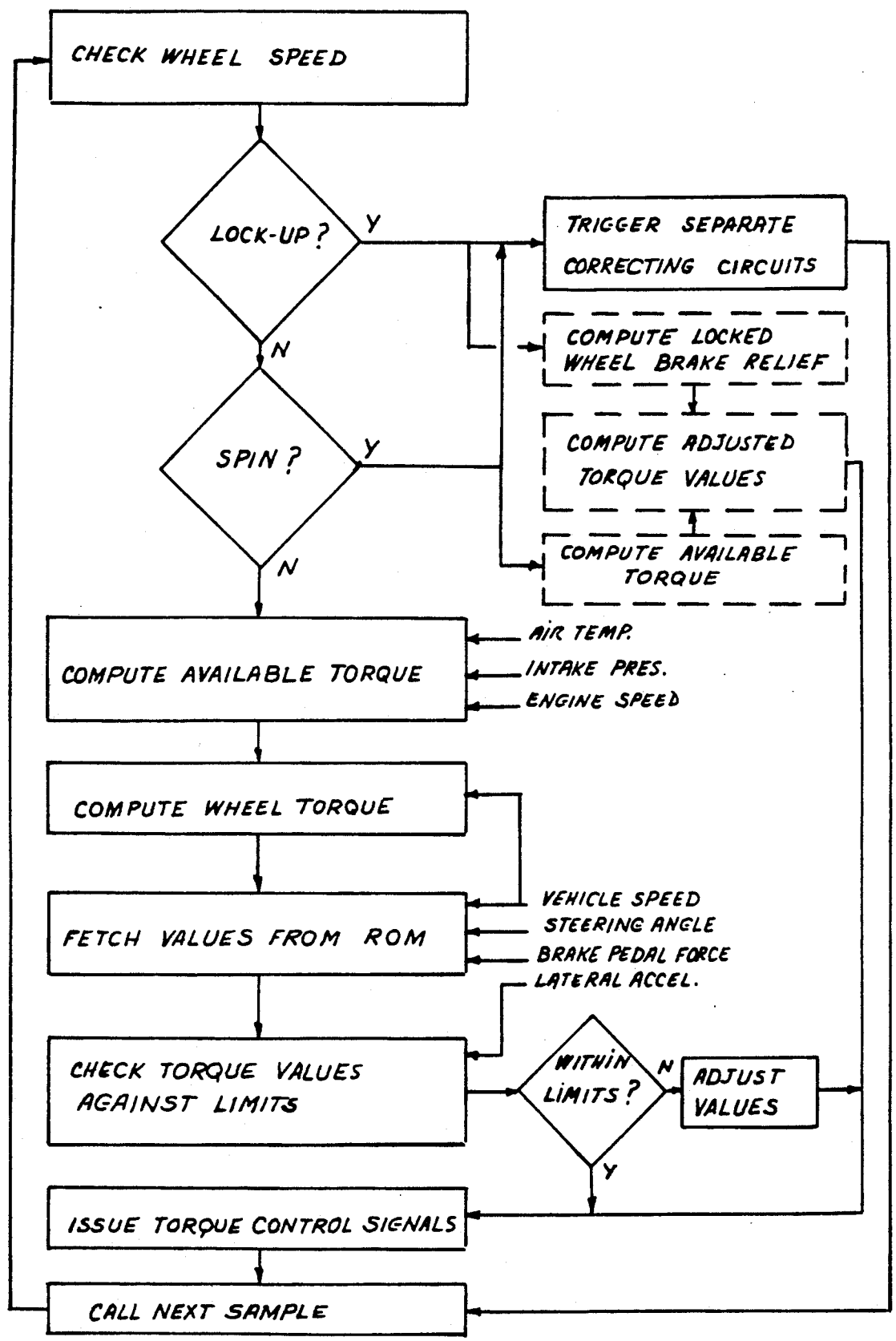
FIG. 11 is a flow diagram of the electronic control unit operation.

The duties and functions of the microprocessor 55 are illustrated in the block diagram of FIG. 11. The output signals 63 of the wheel speed sensors are first analyzed to detect any lockup or spinning conditions. If one of those conditions is detected, the appropriate corrective mechanism are triggered, or, as illustrated by the phantom lined boxes, appropriate signals are generated to control the torque applied to the locked or spinning wheels, as part of the cornering assistance process described below.

First, the microprocessor calculates the available engine torque The appropriate set of torque values 58 is then extracted from the ROM by generating the address code calculate in accordance with the various constant and monitored parameters. Prior to applying the torque value signals 58 to the pulse-width modulators 60, those values are checked against safety limits. If necessary, the torque value signals are adjusted as further explained below.

The duty cycle signal generated by the ECU for each wheel dictates the tractive force applied by that wheel tire. This tractive force is calculated and compared to the available tractive force limit, itself a function of lateral acceleration. The lateral acceleration is directly related to the lateral force applied to the wheel axle. If the calculated tractive force exceeds the set limit, the duty cycle of the control signal is corrected by a factor corresponding to the ratio of the limit over the calculated tractive force. In some applications where smoothness of operation is not critical, the duty cycle itself could be limited rather than corrected. In this case the calculation of the desired torque control value and the mapping of the ROM are greatly simplified.

As so structured, the microprocessor can be programmed to accommodate a variety of cornering situations for a diversity of vehicles. When the system is used in conjunction with a trailer, the safety limit may be set to avoid jack-knifing actions. The microprocessor can even be programmed to control, and even rectify such jack-knifing conditions by appropriate torque applications to the various wheels of the trailer.

Turning now to FIGS. 2-9, the mechanical implementation of the torque control will be described. The conventional brakes and hydraulic actuators 13 on each of the four wheels 11 are used to provide vehicle acceleration control by applying a frictional torque to the rotating wheels. Pressurized hydraulic fluid is supplied to the braking system by an engine driven pump 14 drawing from the fluid reservoir 15, and pressure regulator 16. A control pressure regulator 16a provides a separate supply of pressurized hydraulic fluid for control purposes. A minimum safe fluid level switch 17 warns the vehicle operator of any unsafe condition.

The torque control is provided by individually tuned or adjustable orifices 18, of brake control valves 20 actuated by duty solenoids 19. Each brake control valve 20 modulates the pressure of the output fluid fed to one of the input ports of a brake override system valve 21. The output pressure of the brake override system valve 21 reflects the modulated pressure from the brake control valve, and determines torque applied to the corresponding wheel. The same fluid torque control is used to affect braking whether cornering assistance is required or not. Upon failure of the system, the override valve supplies emergency braking pressure to the individual wheel brake cylinders even in the absence of any electrical power.

As shown in FIG. 3, the master cylinder 22 is actuated by the movement of the brake pedal shaft 23. The shaft presses against a biased force sensor 6 before actuating a double piston 24. The mechanism is biased by coiled springs tending to return the sensor and double piston to a fully open position. The two pistons 24 provide means to stop the car in case of electrical failure or other emergency. They are a back-up system to the ECU controlled brakes. The two pistons 24 act upon two cavities, each drawing fluid separately from the reservoir 15 and discharging pressurized fluid to the brake override system valve 21. This master cylinder 22 is similar to prior art dual brake system configurations. The ECU controlled brakes provide normal brake operation, and the bias spring between sensor and piston provides primary brake "feel" to the operator. The sensor 6 provides the amount of brake pedal forces indicating the desired amount of vehicle deceleration. The force sensor 6 may be a piezoelectric or strain gage type. A displacement sensor could alternately be used since the bias spring provides a displacement proportional to spring force.

As illustrated in FIG. 4, the amplified pulse train signal with variable duty cycle is applied to the solenoid coil 25, which forces the plunger 26 against its biasing spring. Actuation of the plunger 26 closes the normally open valved port 27. This stops any of the pressurized brake fluid passing through orifice 18 from bleeding through the orifice 27 toward the reservoir, and builds pressure in the control valve 20 of FIG. 2. Full continuous closure of orifice 27 by the solenoid valve 19 corresponds to a 100% duty cycle of the pulse train signal. A 50% duty cycle would correspond to the orifice 27 closed half the time resulting in intermediate pressure to the brakes.

The pressurized fluid is applied to one end of a normally closed floating piston 28 of the control valve 28 illustrated in FIG. 50. The increased pressure tends to open the control valve, allowing pressurized system fluid to pass to the individual wheel brake cylinders through the manual override valve 21. If downstream brake pressure is higher than would be set by the duty cycle solenoid, the differential pressure moves the floating piston 28 to the left. This allows brake fluid to bleed into the reservoir. This floating valve arrangement and multi-control mechanism provides a versatile and responsive system which can continuously vary individual wheel torques for optimum cornering as well as anti-lock, anti-spin and anti-jack-knifing control, in total integration with normal braking.

An override valve 21 from a dual diagonally split system is shown in FIG. 6. The valve normally remains in the position shown in the drawing. The fluid pressure from the control valves 20 and the force of the spring provide a higher force against the valve piston 29 than the pressure from the master cylinder 22, forcing the valve piston 29 to the left. In this position, fluid pressure from the control valves 20 is transferred directly through the override valve 21 to control the wheel brakes In the event of a failure in the ECU controlled system, the fluid pressure from the master cylinder 22 overcomes the spring force on the override valve piston 29, causing the piston 29 to move to the right, thus closing the control valve ports and allowing the fluid pressure from the master cylinder to control the wheel brakes. Releasing pressure from the master cylinder allows the piston 29 to travel back to the left, opening the control valve ports and allowing residual fluid in the wheel brake cylinders to bleed into the reservoir through the control valves.

Figure 7:
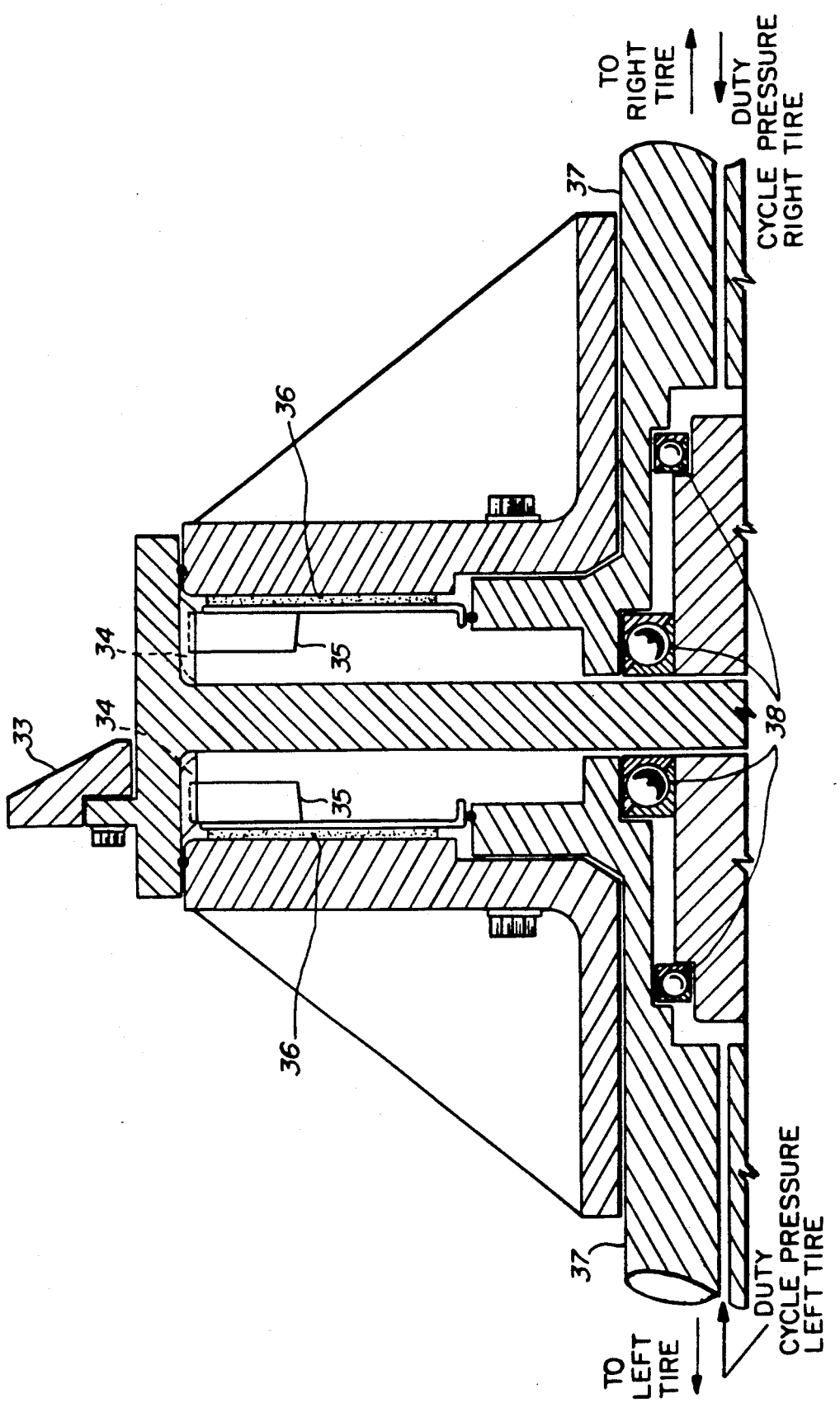
FIG. 7 illustrates an alternate differential torque control mechanism.

FIG. 7 shows an alternate mechanism for controlling the torque applied to a pair of driven wheels. In this embodiment, a wet clutch replaces the prior art engine driven differential.

The engine output shaft and pinion drives a ring gear 33 attached by splines 34 to the clutch plate and tongue 35, which can engage the matching back-to-back clutch plates or discs 36. These clutch plates can be considered to operate inversely to the previously described brake control embodiment. This version provides acceleration torque control instead of deceleration torque control to the wheels. In the pressurized, closed position the clutch couple the output shafts 37 so that they rotate as a solid member driven by ring gear 33. When duty cycle pressure is reduced under control of the ECU 2, plates begin to disengage. This partial disengagement allows controlled slipping to modulate the differential torque applied to the left and right wheels. The bearings 38 support the left and right axle shafts 37. The controlled decrease in fluid pressure can be achieved through a solenoid valve assembly similar to the one used to modulate the brake fluid pressure in the previously described negative torque control mechanism.

Figure 2:
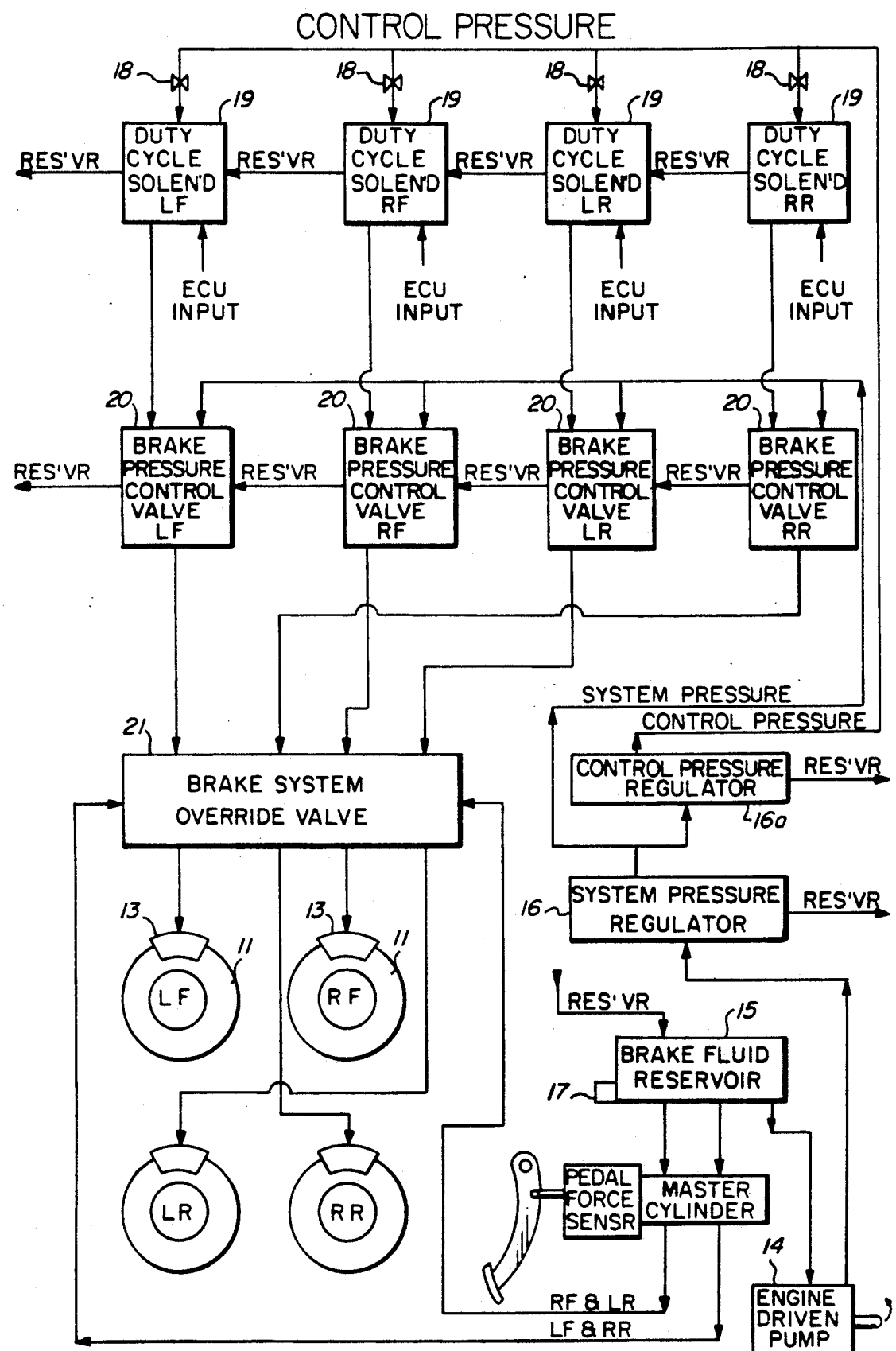
FIG. 2 is a hydraulic fluid block diagram thereof.
Figure 8:
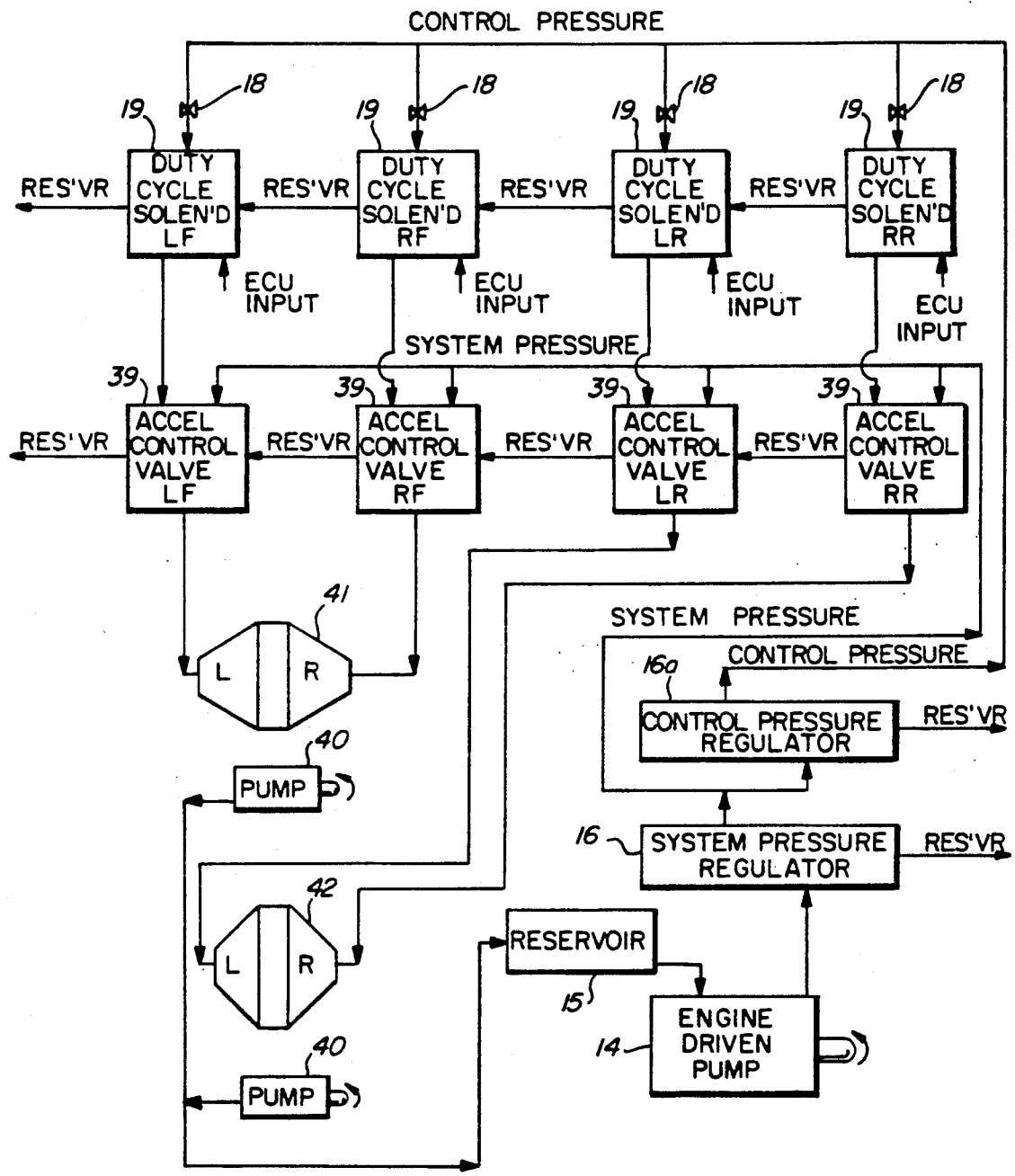
FIG. 8 is a block control diagram of the alternate differential torque control system.

FIG. 8 is a block control diagram, similar to FIG. 2, of the system based on the wet clutch shown in FIG. 7. A motor, engine or other driven pump draws hydraulic fluid from a reservoir 15 supplying the system through the control pressure regulators 16 and 16a. The regulated pressurized fluid is supplied to duty cycle solenoid valves 19. As in the previously described embodiment, the solenoid valves are used to modulate the fluid pressure applied to the acceleration or torque control valves 39. The torque control valves corresponding to the brake pressure control valves 20 of the first embodiment apply the pressure modulated fluid to the differential wet clutches 41 and 42 in accordance with the duty cycle of the signals issued by the ECU 2.

In this embodiment, the sump pumps 40 return fluid to the reservoir 15. The sump pumps may be driven by the input shafts of the differential clutch or by an auxiliary power source such as an electric or air pressure driven motor. Although a four wheel control is illustrated, this torque control technique can only be applied to driven wheels.

Figure 9:
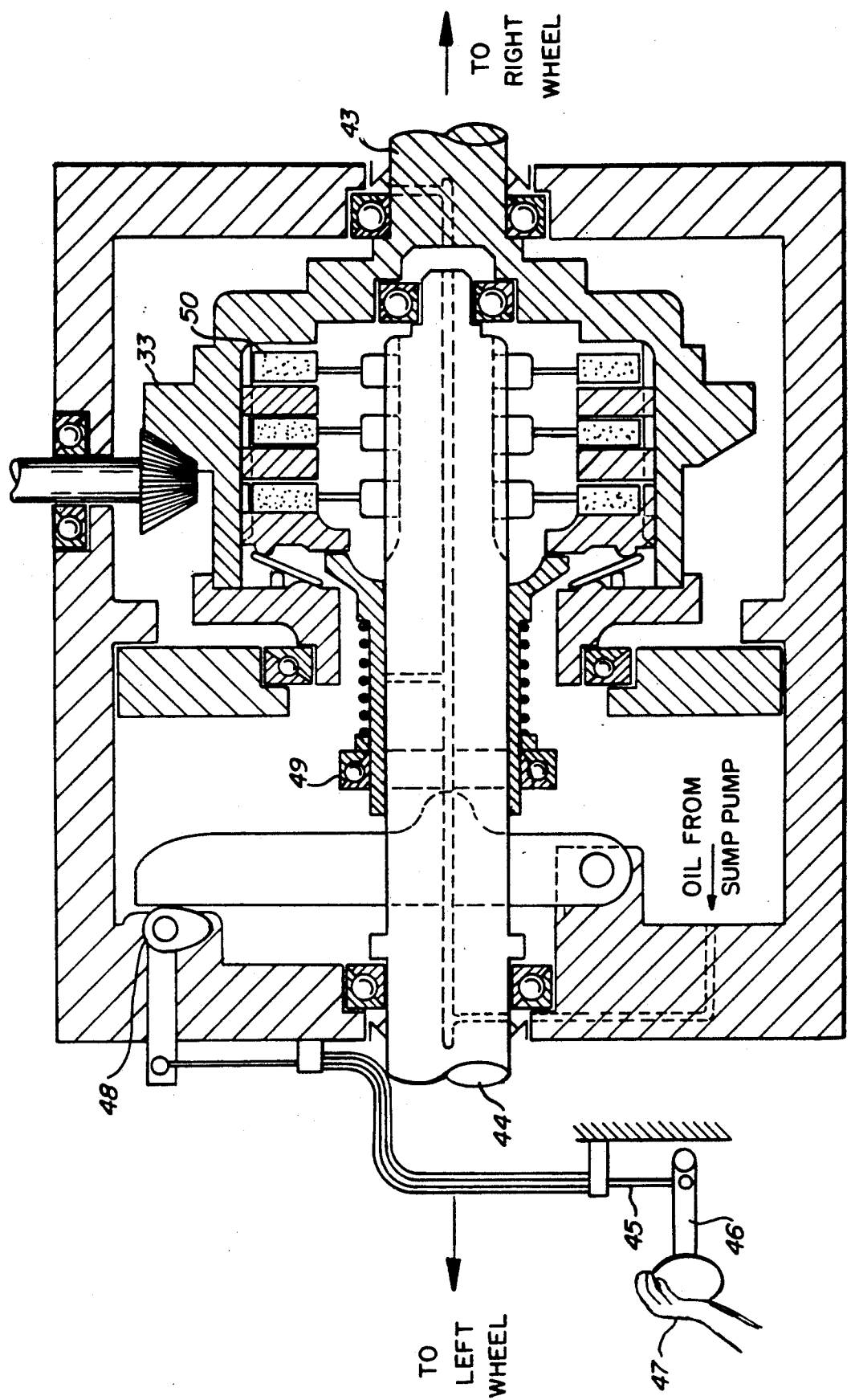
FIG. 9 shows an adjustable clutch torque control mechanism.

FIG. 9 shows a manually controllable multi-wet plate half clutch embodiment which is intended as a form of so-called "stagger" control for race track use. The engine drive shaft drives a differential pinion gear and spur gear 33 similar to prior art and as shown in FIG. 7, except that the right wheel axle 43 is solidly connected to the spur gear 33. The left wheel axle 44 is driven through a wet clutch. A cable adjustment 45 controls the amount of slippage. The cable adjustment 45 may be actuated automatically by the ECU 2 or through lever 46 by the vehicle operator 47. The cable 45 moves a cam 48, displacing a thrust bearing 49 which tends to engage or disengage clutch discs and plates 50. This embodiment is applicable to where generally fixed slippage is required, such as oval race tracks, where turns are nearly always in one direction. The manual lever 46 may be a two position device, or a continuously variable selector. Although this embodiment is shown operating independently of a brake control system, it may also be combined with it under ECU control. The latter would require additional ECU instruction codes, digital maps and calculations relating the interaction results of combined application of brakes or acceleration slippage.

While the preferred embodiments of the invention have been described, modifications can be made and other embodiments may be devised without departing from the spirit of the invention and the scope of the appended claims.

What is claimed is:

1. In combination with a steerable land vehicle having at least one right wheel and one left wheel, an apparatus for improving the cornering movement of the vehicle at a driver-imposed steer angle and under a plurality of constant and variable parameters, which comprises:
   means for determining a total available torque applicable to said wheels;
   means for applying a variable torque to the right wheel;
   wheels for applying a variable torque for the left wheel;
   means, responsive to said means for determining, for calculating a difference between the torques separately applicable to the right and left wheels; and
   means for selectively distributing said available torque according to said difference through said means for applying;
   wherein the means for calculating comprise:
      means for sensing the variable parameters;
      means for detecting the desired angle; and
      means for correlating the constant parameters, said sensed variable parameters, and said detected desired turning angle to the optimum torques; and
   wherein the means for sensing the variable parameters comprise:
      means indicative of the vehicle speed;
      means indicative of the intensity of an applied braking action; and
      at least one accelerometers indicative of the vehicle lateral acceleration.

2. The combination of claim 1, wherein the means for detecting a driver-imposed steer angle comprise a steering wheel turn indicator.

3. The combination of claim 1, wherein the means for detecting a driver imposed steer angle comprise a front wheel steer angle indicator.

4. The combination of claim 1, wherein the means for correlating comprise means for calculating said difference between said torques as a function of the square of the vehicle linear speed, the steering angle, and lateral acceleration.

5. The combination of claim 1, wherein the means for distributing said available torque comprise means for modulating braking forces applied to said wheels.

6. The combination of claim 5, wherein the means for modulating comprise
   a line carrying pressurized fluid to a hydraulic brake mechanism;
   solenoid activated valve for selectively bleeding amounts of said pressurized fluid off said line;
   means responsive to said means for correlating, for generating a pulse train having a duty cycle corresponding to one of said torques; and
   means for applying said pulse train to said solenoid activated valve.

7. The combination of claim 1, wherein the means for distributing said variable torques comprise
   separate clutch means for each of the right and left wheels, said clutch means having adjustable torque transfer functions; and
   means for adjusting said torque transfer functions.

8. The combination of claim 7, wherein the means for adjusting is responsive to the means for correlating.

9. The combination of claim 1, wherein the means for distributing comprise:
   separate clutch means for each of the right and left wheels, said clutch means having adjustable torque transfer functions; and
   means for adjusting said torque transfer functions.

10. The combination of claim 9, wherein the means for adjusting is driver operated.

11. The combination of claim 4, wherein the means for calculating comprise:
    means for storing a look-up table containing sets of data reflecting said constant parameters; and
    means for fetching said sets of data as a function of said variable parameters.

12. The combination of claim 11, wherein said constant parameters comprise vehicle characteristics and tire characteristics.

13. The combination of claim 3, wherein said vehicle comprises a trailer having a steerable front pair of wheels.

14. The combination of claim 5, wherein said means for modulating comprise:
    means for differentially coupling a right wheel and a left wheel to a drive shaft, said means for differentially coupling comprising:
    a pair of back-to-back mounted wet clutch mechanisms each activated by a pressurized fluid line; and
    means responsive to said means for correlating, for selectively bleeding amounts of pressurized fluid from said lines.

15. The combination of claim 10, wherein said means for selectively distributing said available torque comprise:

means for directly coupling one of said wheels to a drive shaft;

a clutch mechanism coupling said shaft to the other wheel;

a line providing pressurized controlling fluid to said clutch mechanism; and means responsive to said means for calculating torque, for selectively bleeding amounts of pressurized fluid from said line.

* * * * *